No. 701,750. Patented June 3, 1902.
H. S. MAXIM.
APPARATUS FOR USE IN THE TREATMENT OF COFFEE.
(Application filed Sept. 9, 1901.)
(No Model.)
2 Sheets—Sheet 1.
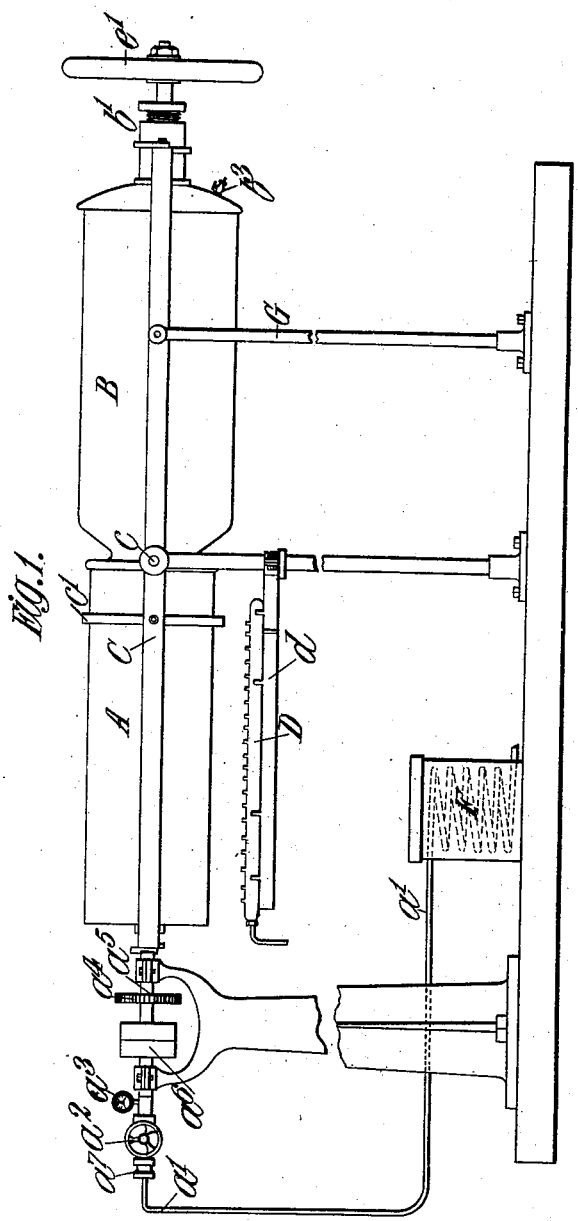

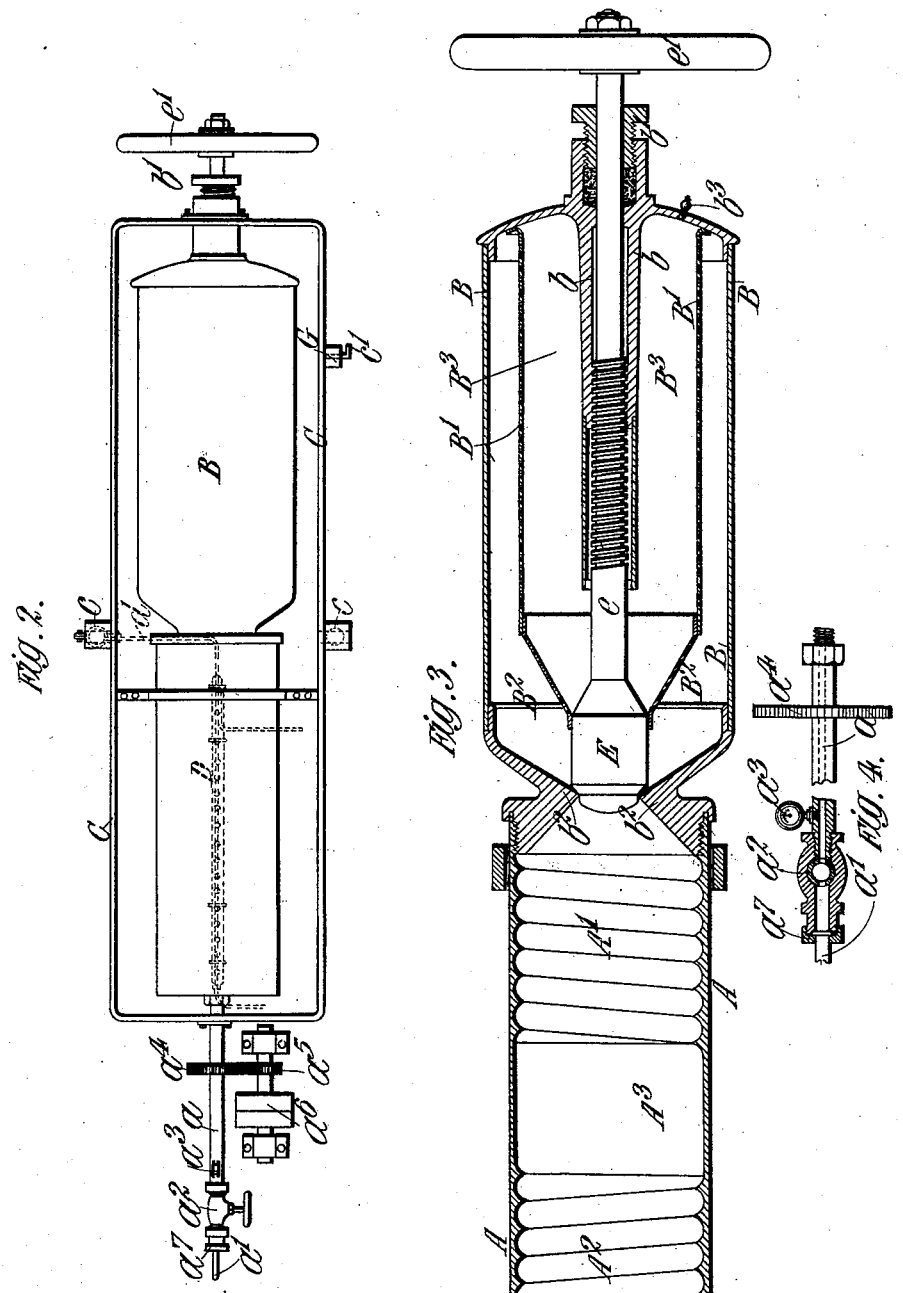

UNITED STATES PATENT OFFICE.

HIRAM STEVENS MAXIM, OF LONDON, ENGLAND.

APPARATUS FOR USE IN THE TREATMENT OF COFFEE.

SPECIFICATION forming part of Letters Patent No. 701,750, dated June 3, 1902.

Application filed September 9, 1901. Serial No. 74,857. (No model.)

*To all whom it may concern:*

Be it known that I, HIRAM STEVENS MAXIM, Chevalier of the Legion of Honor, civil and mechanical engineer, a subject of the King of Great Britain, residing at 18 Queens Gate Place, London, in the county of Middlesex, England, have invented certain new and useful Improvements in Apparatus for Use in the Treatment of Coffee, of which the following is a specification.

This invention has reference to apparatus for use in the treatment of coffee.

I am aware that numerous attempts have been made to recover or save the valuable products which are given off in the process of roasting or torrefying coffee. In order to develop the taste and smell or aroma of coffee, which are so highly prized in all kinds of coffee, it is necessary to heat the coffee-berries to a temperature of about 200° centigrade. At this temperature the valuable aroma and oils of the coffee are developed in the berries; but unfortunately the same temperature that is necessary to bring into existence these oils and perfumes also dissipates a considerable portion of them. As the boiling-point of caffein is about 182° centigrade, it is evident that a considerable portion of this valuable alkaloid must also pass off in the act of roasting. Moreover, in ordinary coffee-roasters the berries are subjected to the air and other gases during the process of roasting, whereby a considerable portion of the valuable products of the coffee is dissolved. Experiments have demonstrated that about one-half of all the valuable products in coffee are discharged into the air during the process of roasting. To recover these valuable products, it has been suggested that the berries should be roasted in an air-tight cylinder and that the products resulting from the roasting should be driven through a condenser and that the condensable products thus obtained should be mixed with coffee substitutes or restored to the coffee; but the objection to this treatment is that the products do not readily condense. Attempts have also been made to absorb the gaseous products resulting from roasting the berries by oils and other substances; but such attempts have not been successful.

It has long been known that if the coffee-berries are roasted under pressure the loss of valuable products is much less than when roasted in the open air; but this process is beset by a great number of difficulties. If the berries are confined and all the valuable products are kept in them, they would be soft or tough and leathery and could not be easily ground. Moreover, the proper flavor is not developed. Furthermore, in the previous attempts to carry out this process there have not been any means provided for ascertaining how the roasting is progressing; neither have there been any means provided for effecting a sufficiently-rapid cooling of the berries to preserve the aroma. The berries when roasted in considerable quantities of, say, five pounds or upward are very liable (if at all confined and great care be not taken to regulate the temperature) to decompose by a species of spontaneous combustion, which evolves large quantities of gases and produces a mass of charcoal.

Now it is the object of my invention to effect the roasting of the coffee-berries under pressure in such manner as to avoid the aforesaid objections and to recover all or the greater part of the valuable products which are driven off in the roasting of the coffee-berries in the ordinary way.

I will now describe my invention with reference to the accompanying drawings, in which—

Figure 1 is a side elevation of the apparatus, and Fig. 2 a plan of the same. Fig. 3 is a longitudinal section of a portion of the apparatus drawn on a larger scale. Fig. 4 is likewise a longitudinal section of another portion of the said apparatus drawn on a larger scale.

A and B are two chambers or cylinders connected together at their inner ends and rotatably mounted in a frame C, which is provided with trunnion-bearings *c c* to enable it and the said cylinders to be turned into an upright position when desired. The cylinder A is adapted to receive the coffee-berries to be roasted, say, in quantities of about one hundred pounds at a time. The cylinder B is adapted to receive the coffee-berries from the cylinder A and also to contain the berries or substitutes which are to absorb the coffee aroma generated in the cylinder A. For the sake of distinction I term the cylinder A the "roasting-cylinder" and the cylinder B the "absorbing-cylinder."

D is a gas-burner mounted on a hinged frame $d$, situated below the roasting-cylinder A, said burner being for the purpose of heating the roasting-cylinder to the required temperature, and the burner is substantially coextensive with the roasting-chamber, so as to properly heat the contents of the latter. Within the absorbing-cylinder B is a plug or valve E, carried by a screw-stem $e$, which works in a correspondingly-screw-threaded socket $b$ within the said cylinder. The outer end of this screw-stem $e$ extends through a stuffing-box $b'$ on the said cylinder and at its extremity is provided with a hand-wheel $e'$ for enabling it to be turned for opening and closing the said valve. The interior of the absorbing-cylinder B is divided into two compartments by means of a perforated or reticulated cylindrical partition B', the free or open end of such partition being reduced in diameter, so as to fit around the said valve E. The end of this valve when closed seats itself against the contracted portion $b^2$ of the said cylinder B and serves to hermetically close the latter. The said valve also serves to close the open end of the said cylindrical partition B'.

The outer end of the cylinder A is provided with an elongated shaft or stem $a$, which is hollow and connected with a condenser F by means of a pipe $a'$. $a^2$ is a valve on the said hollow shaft or stem for enabling the latter to be opened or closed, in accordance with requirements. $a^3$ is a gage for indicating the pressure within the cylinder A. The two cylinders A and B can be connected together by screwing one onto the other, as represented in Fig. 3, or they may be otherwise detachably joined, and rotary motion is imparted to them from an appropriate motor through driving pulleys and gearing $a^4$ and $a^5$.

The coffee-berries to be roasted having been placed into the cylinder A and other coffee-berries or wheat or other suitable grain capable of absorbing the coffee aroma having been placed into the inner compartment $B^3$ of the cylinder B, the two cylinders are connected together in the rocking frame C. This frame is turned into the horizontal position (represented in Figs. 1 and 2) and is locked in this position by means of a pin $c'$, which is inserted through the upper end of a standard G and into a hole provided for its reception in the said frame. In this position the gear-wheel $a^4$ on the hollow shaft or stem $a$ engages with the pinion $a^5$, which is driven from the belt-pulley $a^6$, and rotary motion is thus imparted to the said cylinders A and B. The gas-burner D is then lighted and brought beneath the cylinder A, which during its rotation is thus heated, it being understood that at this stage of the proceedings the valve E is closed, so that there is no communication between the cylinders A and B. As the berries in the cylinder A become heated they give off a large amount of steam, which passes through the hollow shaft or stem $a$ and the pipe $a'$ into the condenser F, whereby said steam is condensed and can be collected in a suitable measuring-glass or other vessel. By collecting and measuring the condensed steam I am able to judge of the condition of the berries as they are heated. When a certain amount of the water from the berries has passed off in the form of steam, the character of the steam becomes slightly changed in that certain non-condensable gases accompany it, which may be ascertained by watching the gaseous products escaping from the outlet of the condenser F. As soon as this change occurs the escape of the gaseous products from the cylinder A to the condenser is shut off by closing the valve $a^2$. The heating is continued and the pressure-gage $a^3$ is kept under careful observation, so that the operator can by reading the pressure indicated by the gage judge of the temperature of the berries within the cylinder A, it being of course well understood that (when water is present) a certain temperature of steam or aqueous vapor is always accompanied by a certain pressure. As the pressure within said cylinder increases the steam or aqueous vapor by having a lower boiling-point than the aromatic gases of the coffee prevents the escape therefrom of any aroma. During this part of the process all the valuable products are thus confined in the berries themselves. A pressure of one hundred pounds to two hundred and fifty pounds to the square inch is necessary to enable the proper taste and smell of the coffee to be obtained. Immediately this pressure is indicated by the gage the burner D is extinguished and the frame carrying it is swung horizontally from its position below the cylinder A. The hand-wheel $e'$ is then turned in a direction to cause the valve E to open the connection between the cylinders A and B. The coupling $a^7$, by which the hollow shaft or stem $a$ is coupled with the pipe $a'$ of the condenser, is disconnected, and the pin $c'$, by which the frame C is connected with the standard G, is detached to permit the swinging frame C to turn into a vertical position with the cylinder A above the cylinder B. The whole of the contents of cylinder A are thereby discharged into the outer compartment $B^2$ of the cylinder B, whereby the heated berries are brought into juxtaposition with the cool coffee-berries or wheat-grains that were previously placed in the said compartment $B^3$. The cool coffee-berries or wheat-grains and the cool cylinder B will absorb a considerable amount of the heat from the hot coffee-berries discharged into the said compartment $B^2$, and as a consequence the pressure within the cylinders will fall from about two hundred and fifty pounds to about twenty pounds to the square inch. As soon as the coffee-berries have been discharged into the cylinder B and the pressure greatly relieved, as aforesaid, each particular coffee-berry will commence to give off its aromatic gases and continue to do so for some fifteen minutes or so, and the berries or wheat-grains within the compartment $B^3$ will absorb these gases. The valve E is then closed and the cylinder B (which is hermetically sealed by the closing of said valve) is disconnected from the cylinder A and set on one side, so that its contents can cool. When the said cylinder B and its contents have thoroughly cooled, such cylinder should be heated again to a temperature of about 250° centigrade, this heating being effected rapidly, so as not to materially heat the berries within the said cylinder. This heating will cause the aromatic gases that have been condensed on the inside of the cylinder during its cooling to leave said surface and combine with the berries. Then when the whole has cooled again any gaseous products which have not been absorbed by the contents of the cylinder may be got rid of by withdrawing them by suction through the valve $b^3$, which may, if desired, be connected with another chamber containing berries for absorbing this superfluous quantity of aromatic gases, so that said gases shall not be wasted, although it is not deemed necessary to show the means for securing these results. The valve E is then opened far enough to uncover the opening in this cylinder, so that the berries in the compartment $B^2$ can be removed, after which the valve E is further opened to uncover the opening in the cylindrical partition B' and permit the berries in the compartment $B^3$ to be removed. The berries that were previously in the compartment $B^2$ are then placed into the compartment $B^3$ and the valve E brought into a position to close this compartment. A fresh quantity of coffee-berries having been placed into the cylinder A, the cylinder B is again connected with the cylinder A and the roasting, discharging, and other operations are performed in an analogous manner to that already described.

By providing the cylinder B with the cylindrical perforated partition B', I am able to keep the berries that absorb the aromatic gases separate from the roasted berries. When, however, wheat-grains or other grains which are larger or smaller than the coffee-berries are employed to absorb the aromatic gases in the cylinder B, the aforesaid perforated partition B' is unnecessary, because the wheat-grains and coffee-berries can be very readily separated by a sieving operation.

As the ends of the cylinder A do not become heated to the same extent as the sides thereof during the roasting operation and as it is necessary to insure as far as possible the heating of all the coffee-berries to the same extent, this cylinder is formed with right and left screw channels $A'$ $A^2$ on its interior, so that as the cylinder rotates these screw-channels will cause the coffee-berries to travel from the ends of the cylinder toward the middle portion $A^3$ and from such middle portion toward the ends, thus keeping the coffee-berries continuously circulating within the cylinder A, so that they all become equally subjected to the heat from the burner D.

When using wheat-grains or other substitutes for coffee, I prefer to treat such grains in the manner set forth in my prior application for United States patent, Serial No. 33,121, filed October 15, 1900, for causing the said grains to assume a porous and vacuous condition to readily absorb the aromatic gases.

In order to assist in obtaining the requisite pressure within the coffee-cylinder A, I may employ a small quantity of alcohol or other suitable and readily vaporizable substance.

It will be found advantageous to employ a considerable number of the cylinders B, so that there will always be sufficient of them available for connection to the cylinder A while the others are laid on one side for cooling.

What I claim, and desire to secure by Letters Patent of the United States, is—

1. In apparatus for treating coffee, the combination with a roasting-chamber, of an absorbing-chamber detachably connected therewith, of means for rotating the chambers, of means for opening and closing communication between them, of means for heating the roasting-chamber, of a condenser for condensing and collecting the steam and gases arising during the initial heating of said roasting-chamber, of means for disconnecting the condenser from the said roasting-chamber, of means for indicating the pressure in the roasting-chamber, and of means for enabling the contents of the roasting-chamber to be quickly discharged into the absorbing-chamber for the purpose specified.

2. In apparatus for treating coffee, the combination with a roasting-chamber, of an absorbing-chamber detachably connected thereto, of a valve capable of being actuated from the exterior of the apparatus for opening and closing communication between said chambers, of a gas-burner for heating the roasting-chamber, said burner being substantially coextensive with the roasting-chamber and being hinged for movement about a vertical axis to permit of its being shifted from its heating position, of a gage for indicating the pressure in said roasting-chamber, of a frame in which the chambers are rotatably mounted, of bearings carrying said frame so that it can be turned into a vertical position, and of means for temporarily maintaining said frame in a substantially horizontal position during the rotation of the chambers and the heating operation as described.

3. In an apparatus for treating coffee, the combination with an absorbing-chamber, of a perforated partition for dividing the chamber into a plurality of compartments and each of the latter having an inlet and a valve common to said inlets.

4. In apparatus for treating coffee, the combination with the absorbing-chamber, of a reticulated or perforated cylindrical partition for dividing this chamber into two concentric compartments, and of a valve serving the double purpose of opening and closing this chamber and of opening and closing the communication between the two concentric compartments for the purpose specified.

5. In an apparatus for treating coffee, the combination with a roasting device, of means for imparting motion to the coffee-berries while in said roasting device, an absorbing-chamber in communication with the roasting device, means for separating the chamber into a plurality of compartments, the separating means being such that different kinds of grains can be kept out of contact while in said absorbing-chamber and each compartment having an inlet, and a valve common to said inlets.

6. In an apparatus for treating coffee, the combination with a roasting device, of an absorbing-chamber, a perforated device for separating the chamber into a plurality of compartments having an inlet, and a valve common to said inlets.

7. In apparatus for treating coffee, the combination with the absorbing-chamber and its reticulated or perforated cylindrical partition, of a plug or valve operated from the exterior of the chamber and having a cylindrical portion for opening and closing the connection between the two concentric compartments and also having a seating-surface for closing the opening in the said chamber substantially as and for the purpose specified.

8. In an apparatus for treating coffee, an absorbing-chamber having a valve-controlled opening through which the gaseous contents can be withdrawn, and a reticulated device separating the said chamber into a plurality of compartments each of which has an inlet.

In testimony whereof I have hereunto set my hand, in presence of two subscribing witnesses, this 28th day of August, 1901.

HIRAM STEVENS MAXIM.

Witnesses:
AUGUST SIEGFRIED DOCEN,
ANDRÉ DI JON.